United States Patent

[11] 3,628,457

[72] Inventors Ingemar Arnold Magnusson
 4, Ringvagen, Grodinge;
 Per Tage Marklund, 60, Olshammatsgatan,
 Bandhagen; Sven Malte Broddner, 65,
 Tideliusgatan, Stockholm; Lars Ax, 13,
 Stenvagen, Tumba; Robert Bert Andersson,
 49, Gallerstagrand, Bandhagen, all of
 Sweden
[21] Appl. No. 786,551
[22] Filed Dec. 24, 1968
[45] Patented Dec. 21, 1971

[54] ROCKET-ASSISTED PROJECTILE OR GUN-BOOSTED ROCKET WITH SUPPORTED PROPELLANT GRAIN
 6 Claims, 1 Drawing Fig.
[52] U.S. Cl. .................................................. 102/49.3,
 60/255
[51] Int. Cl. ......................................................... F42b 13/28
[50] Field of Search .......................................... 60/253,
 255, 35.6 RS; 102/49.3, 49.7

[56] References Cited
 UNITED STATES PATENTS
 2,391,865 1/1946 Chandler ...................... 60/255 X
 2,773,448 11/1956 Jasse ............................ 102/49.7
 3,212,256 10/1965 Sampson ...................... 60/255
 FOREIGN PATENTS
 1,168,803 4/1964 Germany ...................... 102/49.3

*Primary Examiner*—Verlin R. Pendergrass
*Attorney*—Holman & Stern

ABSTRACT: A rocket-assisted projectile having a central supporting tube surrounded by an annular propellant charge, with an annular space between the tube and propellant decreasing in width towards the rear of the projectile. The axial length of the propellant charge is less than that of the chamber containing the propellant to permit elastic deformation of the propellant in the axial direction.

PATENTED DEC21 1971 3,628,457
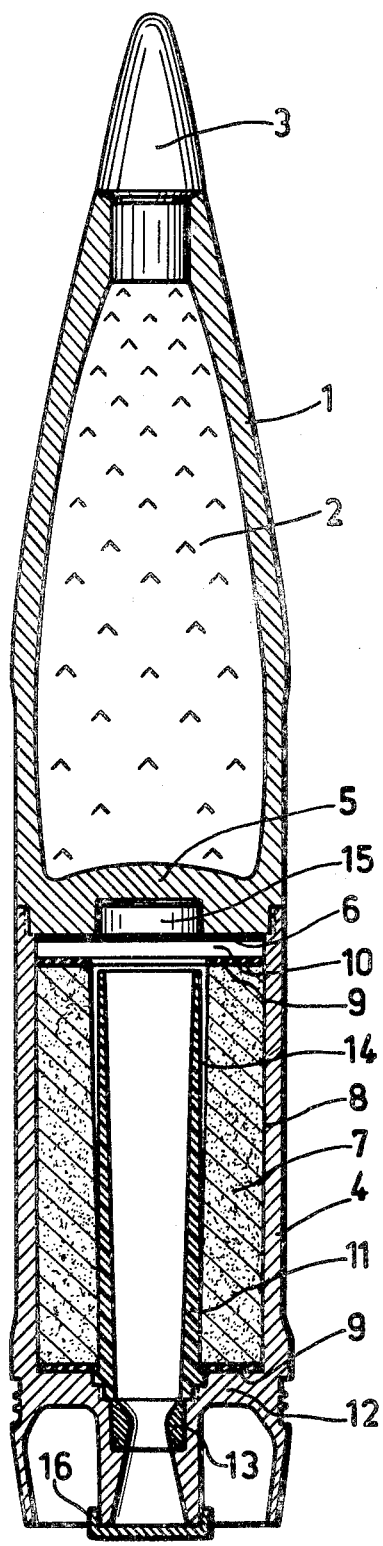
INVENTORS
I.A. MAGNUSSON ET AL
By Holman, Glascock, Downing
& Seebold
ATTORNEYS

ROCKET-ASSISTED PROJECTILE OR GUN-BOOSTED ROCKET WITH SUPPORTED PROPELLANT GRAIN

The present invention relates to rocket technology and particularly to a gun-boosted rocket or rocket-assisted projectile. In the following the notation RAP is used. This expression covers rocket-assisted projectiles as well as gun-boosted rockets, GBR.

A well-known method to increase the range of a gun is to supply the round with a rocket which is ignited when the round has left the muzzle of the weapon. Such a combination usually is called RAP or GBR. The impulse which the rocket delivers will increase the velocity of the projectile and consequently the range.

There are great problems to design a RAP motor. The high acceleration forces experienced by the projectile when it is launched often causes rupture in different components. This specially holds for the solid rocket propellant grain, due to the fact that every known type of solid rocket propellant has rather poor mechanical properties. A crack in the solid propellant can cause misfunction of the motor and also cause explosion of the whole projectile.

In spin-stabilized vehicles the solid rocket propellant grain will experience a high load due to the centrifugal forces. For a cylindrical grain configuration this means high tensile stresses, especially in the center of the grain. This makes it necessary to use hard types of solid rocket propellants with a high tensile strength. Such types of solid rocket propellants will necessarily become brittle. Consequently the risk for cracks during the launch will increase. Besides, these types of solid rocket propellant generally have a low specific impulse.

The present invention eliminates all these disadvantages. The characteristics of the invention, other objects, aspects and advantages will become apparent from the following description in connection with the accompanying drawing, where the invention is shown in caliber 15.5 cm. This does not mean that the invention is bound to this example.

The RAP includes a warhead consisting of a conventional shellcase 1 with explosive 2 and fuze 3. The warhead may be of any suitable type and forms no part of the present invention. The rocket motor 4 is separated from the warhead by a wall 5 which is covered with a heat insulating plate made of, for example asbestos-phenolic laminate 6. The solid rocket propellant grain 7 is a conventional internal burning cylinder with insulation on the mantle 8 of the cylinder and on the two ends. The insulation on the mantle of the cylinder can be very thin ≤ 0.5 mm. The grain is a little shorter than the motor chamber so there is formed a space 10 between the grain and the front end of the rocket motor.

In the perforation of the grain there is a central supporting tube 11. The tube is fixed to the rear end 12 of the rocket motor, with a smooth junction to the nozzle 13 of the rocket motor. The tube has a smaller center diameter than the perforation of the grain. Consequently a uniform or forwardly increasing space 14 is formed between the grain and the central supporting tube. The spaces 10 and 14 mean that the grain does not completely fill the volume of the motor.

The material choice for the central supporting tube 11 which is suitably formed with a wall increasing in thickness rearwardly, has proved to be of great significance. Good results have been obtained with tubes made of glass-fiber-reinforced plastic, but tubes made of phenolic-asbestos laminate may also be used as well as tubes made of different metals. The ignitor 15 of the rocket motor, with a delay unit, may be placed in the cover for the nozzle 16 in the tube or, as shown in the example, in the front end of the motor.

In those cases where the grain needs to be fixed more accurately in the motor, this can suitably be made by gluing the grain to the wall of the motor. To reduce the shear stresses, the grain shall only be glued to about one-third of the length thereof. The glued surface shall be in the rear end of the motor. Additionally, the grain may advantageously be partially or completely case bonded through a suitable liner.

The rocket motor of the RAP works according to the following short description.

When the projectile is launched the acceleration forces will press the grain backwards, consequently the grain will be deformed until it will be supported by the rear end of the motor, the walls of the motor and the central supporting tube. If such types of solid rocket propellants are used which have sufficient tensile strain, for example composite propellants with carboxy-terminated polybutadiene as binder, no cracks will occur during the deformation.

The compressive stresses of about 1,000 bar which the grain experiences during the launch, will be taken up as a hydrostatic pressure. The grain is subjected to a total hydrostatic containment. Incompressible materials, to which soft types of solid rocket propellants generally belong, have, when subjected to a hydrostatic containment, an almost unlimited tensile strength.

When the projectile leaves the weapon, the axial acceleration ceases. By the viscoelastic behavior and the high centrifugal force the grain will not only go back to its original length, but will then be elongated until it is supported by the front end of the motor. Even in this case the grain is subjected to a hydrostatic containment. After the elongation, the space 14 between the grain and the tube is formed again and has become larger. This renders it possible that the rocket propellant is ignited by assistance of the ignitor 15 and burns radially.

The function of the above described RAP has been proved experimentally at accelerations of 15,000 g. as well as in spin tests at 15,000 r/m and was additionally confirmed by a throughout successful test series in a 15.5 cm. howitzer. The centrifugal force increases the burning rate of the propellant. The spin also causes a swirling flow which reduces the effective nozzle throat area. The effect of these two factors can be eliminated by an increase in the nozzle throat area, depending on the spin speed.

Advantageously, the supporting tube 11 may be formed of a material which is consumed in the burning of the propellant, thus adding to the propulsive force. Such a material, for example, may comprise aluminum or magnesium or alloys thereof, or a suitable consumable organic material.

What we claim is:

1. Rocket-assisted projectile the driving part of which is a rocket motor consisting of a grain with a central perforation and a tube-formed case, the mantle of which forms the outer wall of the rocket propellant chamber and with a rear end, which has a central nozzle and one supporting tube, which forms the inner wall for the rocket propellant chamber and has connections to the chamber through one or several openings, characterized in that the rocket grain consists of a solid propellant having a high tensile strength and subject to axial compression from axial launching forces, and that the supporting tube in the central perforation of the grain has an outer dimension which in every cross section of the tube is less than the dimension of the central hole in the grain thereby defining an annular space between the tube and the grain, and substantially surrounding the tube so that the grain during the launch will thereby compress axially under the influence of axial force and expand radially against the tube without cracking, and when the axial force ceases the grain will resume its earlier shape and consequently reform said annular space between the grain and the supporting tube whereby radial burning of the grain is rendered possible.

2. Rocket-assisted projectile according to claim 1, preferably spinstabilized, characterized in that the length of the grain is shorter than the length of the rocket chamber, so that a space is formed between the front end of the motor and the front of the grain, so that the grain after the launch of the rocket-assisted projectile, when spinning can be elongated by the centrifugal forces and forced to take support by the two ends of the rocket chamber, whereby the space between the grain and the supporting tube is enlarged.

3. Rocket-assisted projectile according to claim 1 or 2, characterized in that the mantle of the grain is at least partly casebonded, through a liner.

4. Rocket-assisted projectile according to claim 3, characterized in that the space between the supporting tube and the grain increases forwardly.

5. Rocket-assisted projectile according to claim 4, characterized in that the supporting tube comprises a self-consuming material increasing the impulse of the solid rocket motor.

6. Rocket-assisted projectile according to claim 5, characterized in that the wall thickness of the supporting tube increases rearwardly.

* * * * *